United States Patent

Lee et al.

(10) Patent No.: US 12,385,615 B2
(45) Date of Patent: Aug. 12, 2025

(54) VEHICLE LAMP

(71) Applicant: SL Corporation, Daegu (KR)

(72) Inventors: Min Seop Lee, Gyeongsan-si (KR); Jong Un Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/797,956

(22) Filed: Aug. 8, 2024

(65) Prior Publication Data

US 2025/0052394 A1    Feb. 13, 2025

(51) Int. Cl.
*F21S 41/20* (2018.01)
*B60Q 1/20* (2006.01)
*F21S 41/265* (2018.01)
*F21S 41/275* (2018.01)
*F21S 41/30* (2018.01)
*F21S 41/40* (2018.01)
*G02B 3/00* (2006.01)

(52) U.S. Cl.
CPC .............. *F21S 41/285* (2018.01); *B60Q 1/20* (2013.01); *F21S 41/30* (2018.01); *F21S 41/40* (2018.01); *F21S 41/265* (2018.01); *F21S 41/275* (2018.01); *G02B 3/0056* (2013.01); *G02B 3/0062* (2013.01); *G02B 3/0068* (2013.01); *G02B 3/0075* (2013.01)

(58) Field of Classification Search
CPC .. G02B 3/0056; G02B 3/0062; G02B 3/0068; G02B 3/0075; F21S 41/265; F21S 41/275
See application file for complete search history.

(56) References Cited

U.S. PATENT DOCUMENTS

| | | | | |
|---|---|---|---|---|
| 11,971,148 B1 * | 4/2024 | Eckstein | ............... | F21S 41/143 |
| 2005/0225999 A1 * | 10/2005 | Bucher | .................... | F21V 7/28 |
| | | | | 362/539 |
| 2019/0072252 A1 * | 3/2019 | Moser | .................... | F21S 41/68 |
| 2019/0301701 A1 * | 10/2019 | Kuboyama | ........... | F21S 43/241 |

* cited by examiner

*Primary Examiner* — Colin J Cattanach
(74) *Attorney, Agent, or Firm* — United One Law Group LLC; Kongsik Kim; Jhongwoo Peck

(57) ABSTRACT

A vehicle lamp capable of forming a predetermined beam pattern includes a light source unit, which includes at least one light source and generates light, and an optical unit, which transmits at least some of the light emitted from the light source unit to form the beam pattern. The optical unit includes an incident part, which includes a plurality of incident lenses, and an exit part, which includes a plurality of exit lenses respectively corresponding to the plurality of incident lenses. At least one shield part is disposed between the plurality of incident lenses and the plurality of exit lenses to obstruct some of the light traveling toward the exit lenses.

12 Claims, 12 Drawing Sheets

VEHICLE LAMP

CROSS-REFERENCE TO RELATED APPLICATION

This application claims priority from Korean Patent Application No. 10-2023-0104221 filed on Aug. 9, 2023, which is incorporated herein by reference in its entirety.

BACKGROUND

1. Technical Field

The present disclosure relates to a vehicle lamp, and more particularly, to a vehicle lamp capable of providing an aesthetically appealing exterior not only at night but also during the day.

2. Description of the Related Art

Generally, vehicles are equipped with various lamps intended for illumination functions for more easily identifying objects located around the vehicle during low-light conditions (e.g., nighttime driving), and for signaling functions for notifying surrounding vehicles or pedestrians of the vehicle's driving status.

For example, headlamps and fog lamps are primarily intended for illumination, and turn signal lamps, tail lamps, and brake lamps are primarily intended for signaling. Each lamp is designed to adequately fulfill its function, and its installation standards and specifications are regulated.

While vehicle lamps have been traditionally for illumination and signaling functions, the importance of lamps from a design perspective has been increasingly significant recently. Consequently, there is a demand for enhancing the aesthetic appeal perceived by consumers through improved exterior designs formed by vehicle lamps, during both nighttime driving and daytime driving.

SUMMARY

Aspects of the present disclosure provide a vehicle lamp that not only improves the exterior design of a vehicle by forming an image of a predetermined color during nighttime driving, but also during daytime driving.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a light source unit that includes at least one light source and generates light; and an optical unit that is disposed in front of the light source unit and allows a predetermined beam pattern to be formed by transmitting at least some of the light generated from the light source unit. The optical unit may include an incident part, which includes a plurality of incident lenses; an exit part, which includes a plurality of exit lenses corresponding to the plurality of incident lenses; and at least one shield part, which is disposed between the plurality of incident lenses and the plurality of exit lenses to obstruct some of light traveling toward the exit lenses.

The at least one shield part may include a plurality of shields, and each of the plurality of shields may include a first reflective part and a second reflective part, which is disposed in front of the first reflective part.

The first reflective part may reflect at least some of the light generated from the light source unit back toward the light source unit. The second reflective part may reflect at least some of light incident from a front side of the optical unit back toward the front side of the optical unit.

The first reflective part and the second reflective part may have different reflectivities. The second reflective part may have a lower reflectivity than the first reflective part.

The first reflective part may have a substantially uniform reflectivity across different wavelength bands of light. The second reflective part may have non-uniform reflectivities across different wavelength bands of light. The second reflective part may have a higher reflectivity for a predetermined wavelength band within a visible light spectrum, and may form an image in a color corresponding to the predetermined wavelength band.

At least one of the first reflective part or the second reflective part may include a plurality of deposition layers, which transmit therethrough or reflect light of a predetermined wavelength band. The plurality of deposition layers may include metal layers whose reflectivity has been determined based on their thicknesses. The plurality of deposition layers may include adjusting layers that control the reflectivity of the metal layers for different wavelength bands of light.

The at least one shield part may include a main shield part, which includes a plurality of main shields disposed at or near a rear focus of each of the exit lenses. The at least one shield part may further include an additional shield part, which includes a plurality of additional shields disposed in front of the plurality of main shields.

The vehicle lamp according to the present disclosure may provide the following advantages.

By configuring each shield, which blocks some of the light directed toward each of the exit lenses, to include a first reflective part and a second reflective part disposed in front of the first reflective part, and by ensuring that the first reflective part has a uniform reflectivity across various wavelength bands while the second reflective part has a higher reflectivity for a predetermined wavelength band, the vehicle lamp facilitates the creation of an image in a color corresponding to the wavelength band of the light reflected by the second reflective part when viewed from outside, and thus enables an aesthetically appealing exterior design.

Additionally, since an image with a predetermined color can be produced by the light reflected by the second reflective part from external light, the vehicle lamp also allows for the implementation of an aesthetically appealing exterior design both during nighttime and during daytime.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or"" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Embodiments of the present disclosure will be described with reference to the attached drawings.

Figure 1:
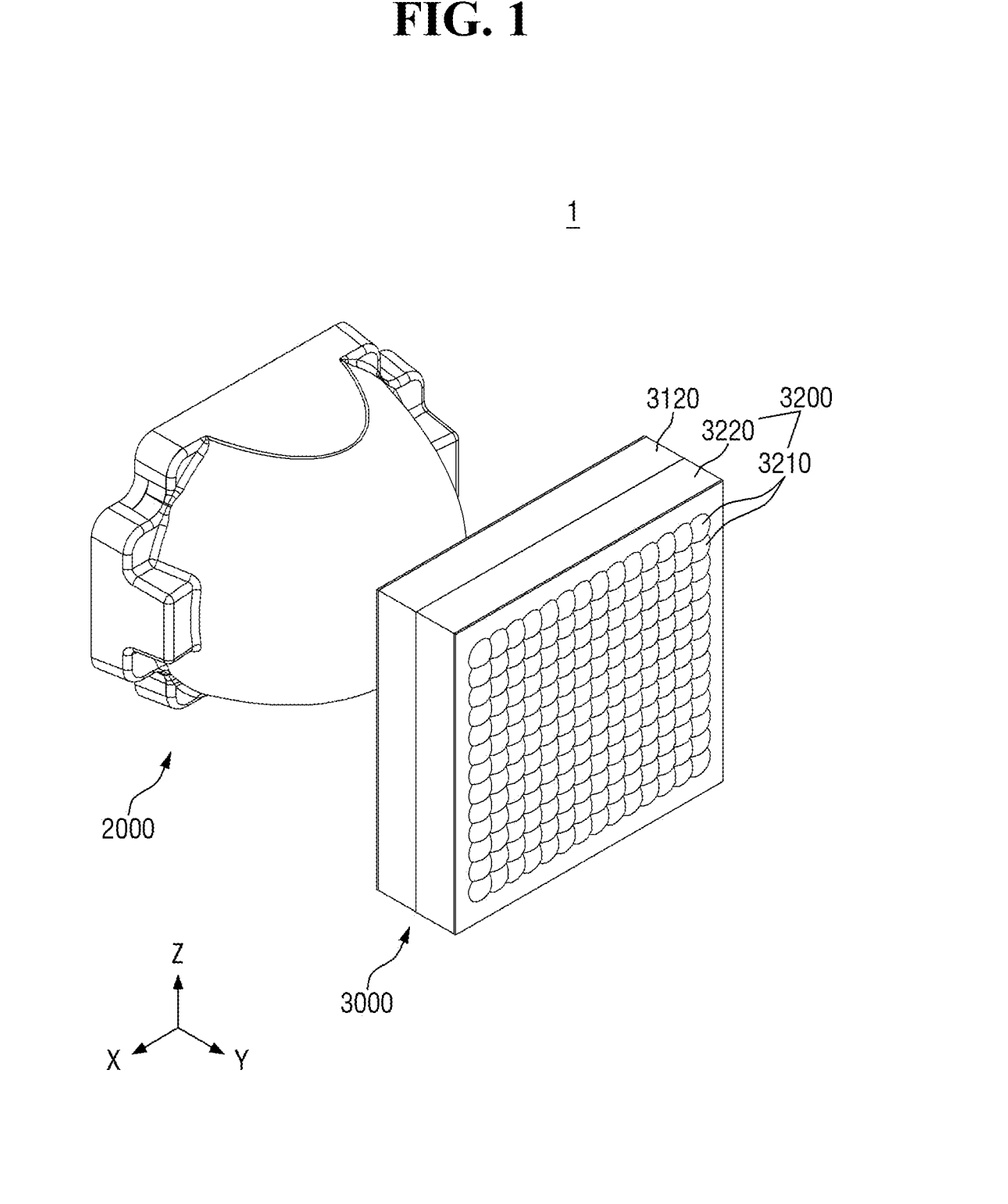
FIGS. 1 and 2 are perspective views illustrating a vehicle lamp according to an embodiment of the present disclosure.
Figure 2:
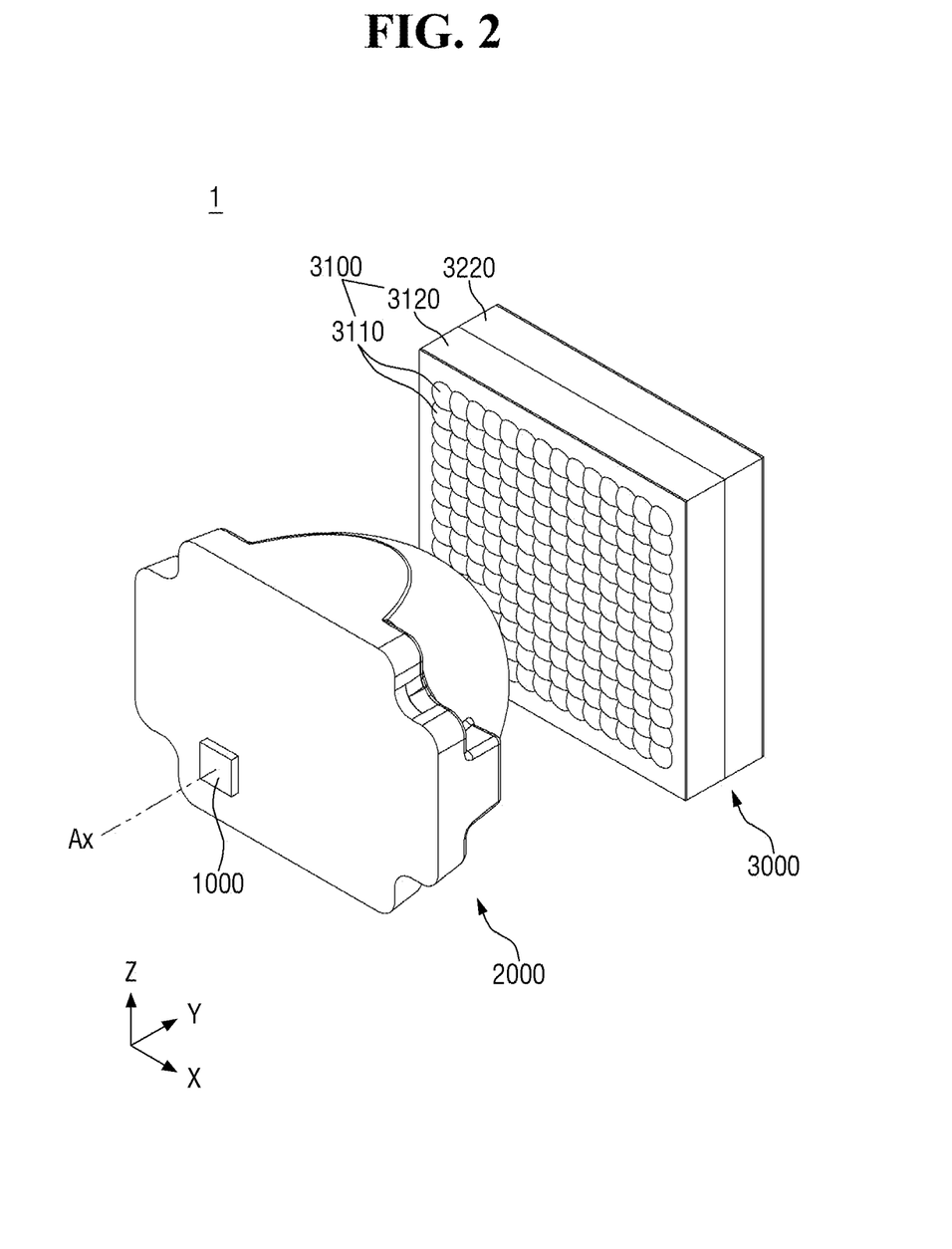
Figure 3:
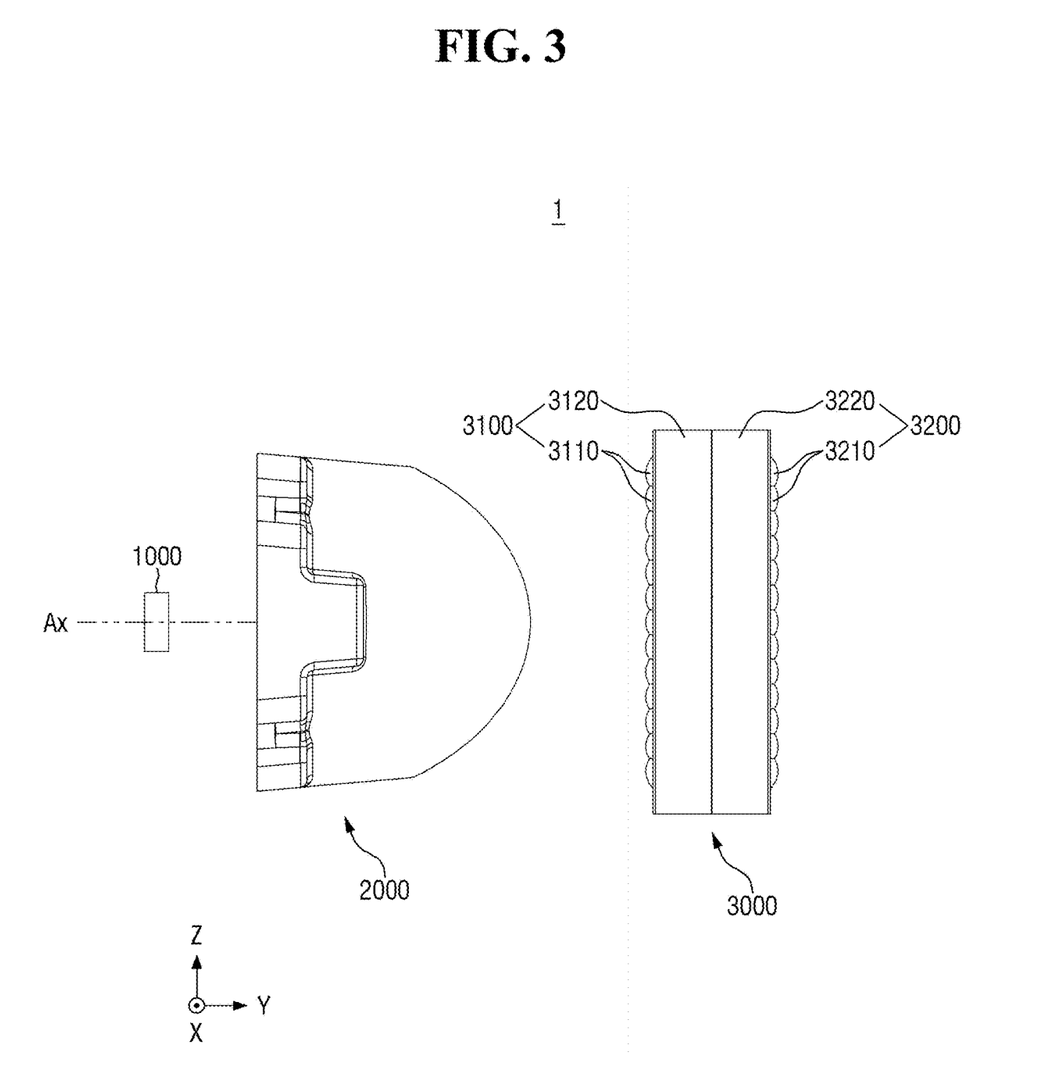
FIG. 3 is a side view illustrating the vehicle lamp according to an embodiment of the present disclosure.

FIGS. 1 and 2 are perspective views illustrating a vehicle lamp according to an embodiment of the present disclosure, and FIG. 3 is a side view illustrating the vehicle lamp according to an embodiment of the present disclosure. Referring to FIGS. 1 through 3, a vehicle lamp 1 may include a light source unit 1000, a light path adjustment unit 2000, and an optical unit 3000.

The vehicle lamp 1 may be used as a headlamp, which irradiates light in a vehicle's driving direction to secure forward visibility for the driver when the vehicle is driven at night or through a dark place such as a tunnel, but the present disclosure is not limited thereto. That is, the vehicle lamp 1 may also be used for various other purposes such as a tail lamp, a brake lamp, a daytime running lamp, a fog lamp, a turn signal lamp, and a backup lamp installed in the vehicle.

When used as a headlamp, the vehicle lamp 1 may form at least one of two beam patterns, i.e., a low beam pattern that projects light downward relative to a predetermined cutoff line to ensure a broad near-field view without causing glare to the drivers of oncoming vehicles or vehicles ahead, and a high beam pattern that projects light relatively upward compared to the low beam pattern to secure a long visibility distance for the vehicle's front far-field.

Figure 4:
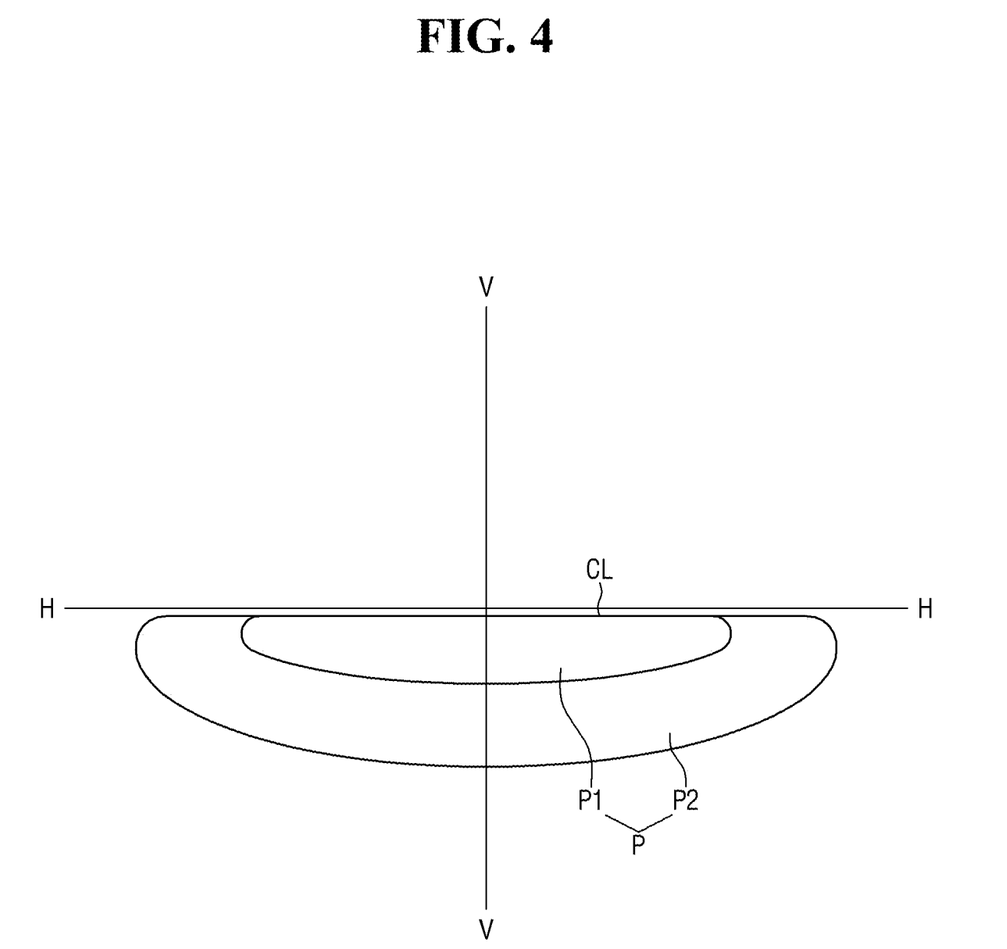
FIG. 4 is a schematic view illustrating a beam pattern formed by the vehicle lamp according to an embodiment of the present disclosure.

A case where a low beam pattern P with a predetermined cutoff line CL is formed by the vehicle lamp 1, as illustrated in FIG. 4, will hereinafter be described as an example. Referring to FIG. 4, the low beam pattern P may include a high-intensity area P1, which has a relatively high brightness to improve visibility distance, and a spread area P2, which has a lower brightness compared to the high-intensity area Pl but is formed to expand in at least one of a top-bottom direction or a left-right direction with respect to the high-intensity area PI to ensure a broader field of view in front of the vehicle.

In the present disclosure, the X-axis may represent the left-right direction (e.g., the lateral direction) or the width direction of the vehicle, the Y-axis may represent a front-rear direction (e.g., the longitudinal direction) or the direction of the vehicle's travel, and the Z-axis may represent the top-bottom direction (e.g., the vertical direction) or the height direction of the vehicle.

The light source unit 1000 may include at least one light source capable of generating light with an appropriate intensity and/or color for the intended use of the vehicle lamp 1. A semiconductor light-emitting element such as a light-emitting diode (LED) may be used as the at least one light source, but the present disclosure is not limited thereto. The at least one light source may include various other light sources such as a laser diode (LD) or a bulb, and optical elements such as a reflector, a phosphor, or a mirror may be additionally used depending on the type of the at least one light source.

The light path adjustment unit 2000 is disposed in front of the light source unit 1000 and concentrates the light emitted from the light source unit 1000 within a predetermined angular range around an optical axis Ax that passes perpendicularly through the center of the emission area of the light source unit 1000, thereby transforming the concentrated light into a collimated light beam that is substantially aligned with the optical axis Ax. The light path adjustment unit 2000 may ensure that the light emitted from the light source unit 1000 is uniformly incident upon the optical unit 3000, resulting in a beam pattern formed by the vehicle lamp 1 having a substantially uniform brightness.

For example, aspherical lenses may be used in the light path adjustment unit 2000, but the present disclosure is not limited thereto. Alternatively, the light path adjustment unit 2000 may utilize various other types of lenses, such as Fresnel lenses or total internal reflection (TIR) lenses, to transform the light emitted from the light source unit 1000 into a collimated light.

The optical unit 3000 may allow at least some of the light incident from the light source unit 1000 to be emitted, forming a beam pattern suitable for the intended use of the vehicle lamp 1.

Figure 5:
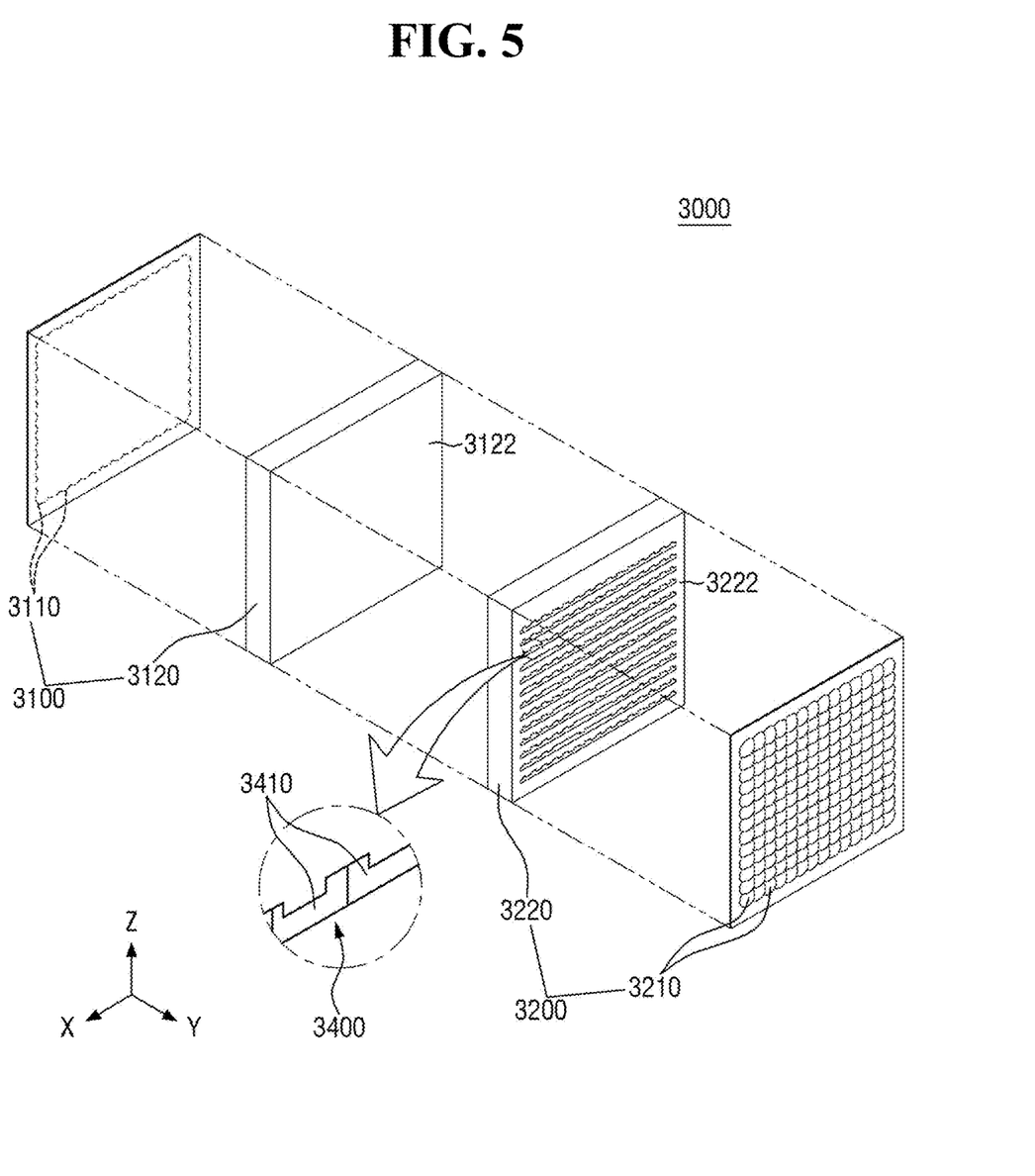
FIGS. 5 and 6 are exploded perspective views illustrating an optical unit according to an embodiment of the present disclosure.
Figure 6:
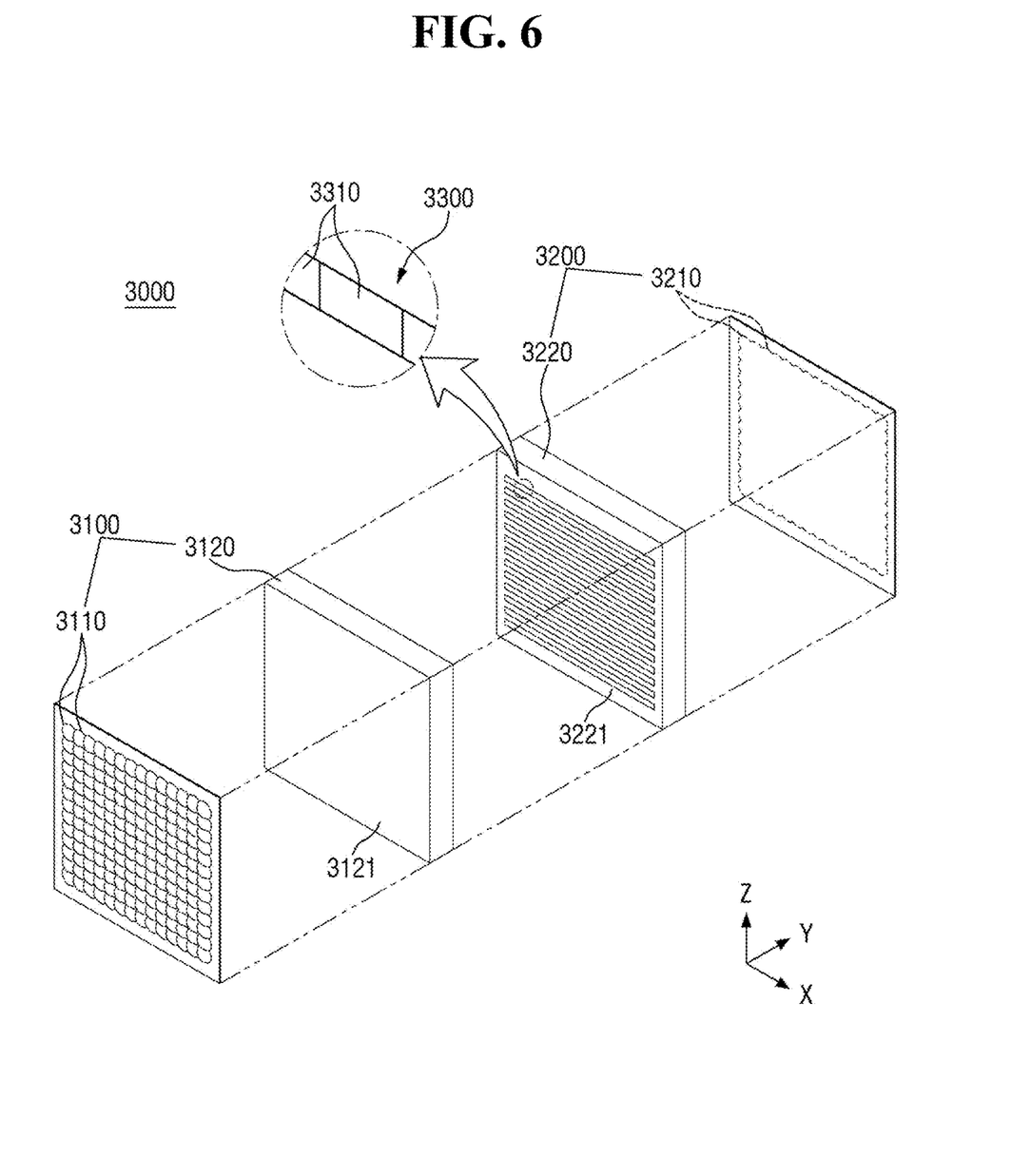
Figure 7:
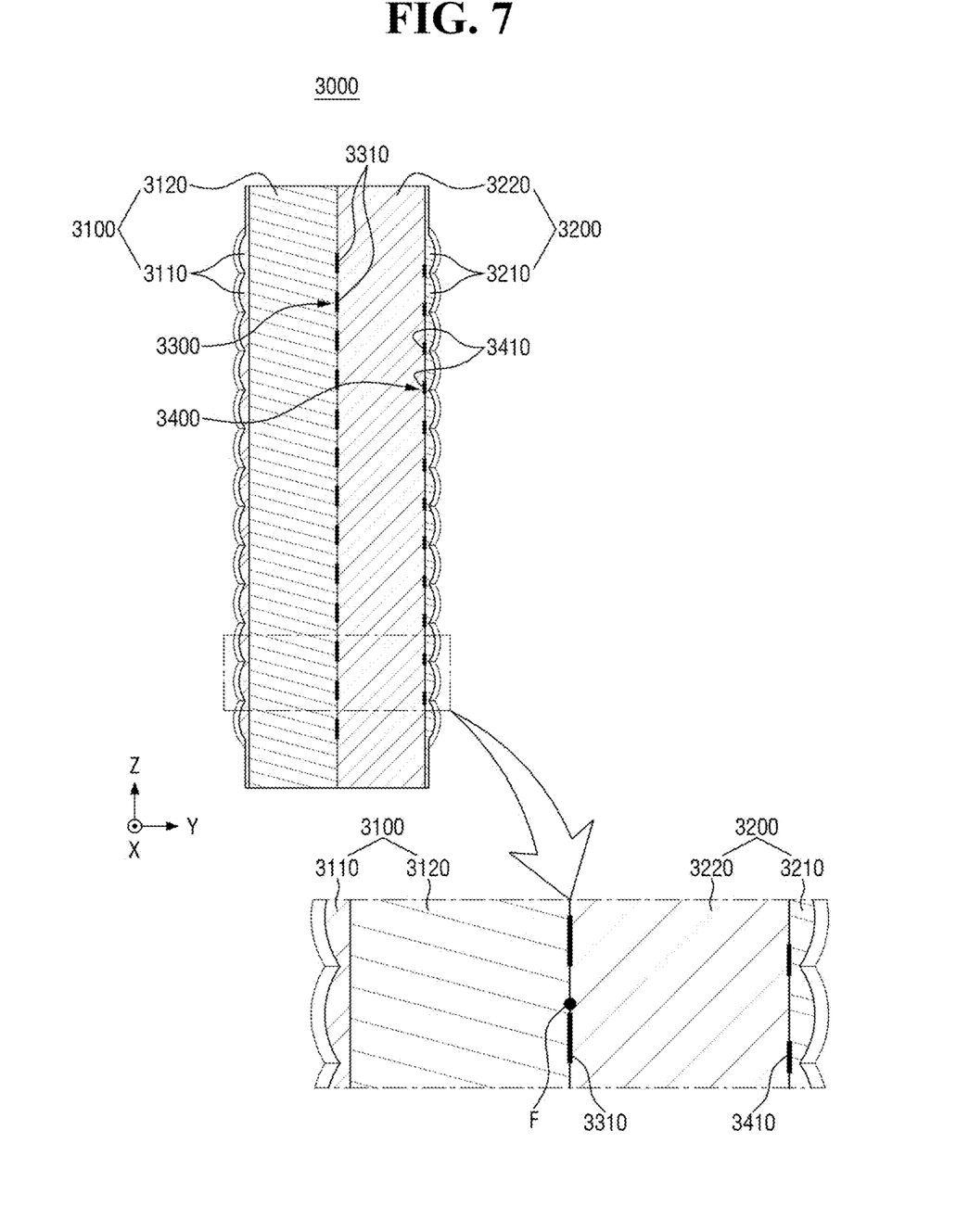
FIG. 7 is a cross-sectional view illustrating the optical unit according to an embodiment of the present disclosure.

FIGS. 5 and 6 are exploded perspective views illustrating an optical unit according to an embodiment of the present disclosure, and FIG. 7 is a cross-sectional view illustrating the optical unit according to an embodiment of the invention. Referring to FIGS. 5 through 7, the optical unit 3000 may include an incident part 3100 and an exit part 3200.

The incident part 3100 may include a plurality of incident lenses 3110 and a first light-transmitting portion 3120, and the exit part 3200 may include a plurality of exit lenses 3210 and a second light-transmitting portion 3220. For example, micro-lenses with a relatively short focal length may be used as the incident lenses 3110 and the exit lenses 3210 for miniaturization purposes.

The incident lenses 3110 may be disposed on an incident surface 3121 of the first light-transmitting portion 3120, and the exit lenses 3210 may be disposed on an exit surface 3222 of the second light-transmitting portion 3220. Further, an exit surface 3122 of the first light-transmitting portion 3120 and an incident surface 3221 of the second light-transmitting portion 3220 may be disposed to adjoin or be adjacent to each other, allowing the light incident upon the incident lenses 3110 to be guided through the first and second light-transmitting portions 3120 and 3220 to the exit lenses 3210 for emission.

Between the incident lenses 3110 and the exit lenses 3210, at least one shield part 3300 and 3400, which obstructs some of the light incident upon the incident lenses 3110 and then traveling to the exit lenses 3210, may be disposed.

The shield part 3300 and 3400 may include a main shield part 3300, which is disposed between the incident part 3100 and the exit part 3200, and an additional shield part 3400, which is disposed in front of the main shield part 3300.

The main shield part 3300 may include a plurality of main shields 3310, each disposed at or near a rear focus F of the corresponding exit lens 3210. More particularly, the upper central portion of each of the main shields 3310 may be disposed at or near the rear focus F of the corresponding exit lens 3210, allowing the low beam pattern P to be formed with a cutoff line CL, as illustrated in FIG. 4.

In other words, the light emitted through each of the exit lenses 3210 below the rear focus F may be refracted upward, potentially causing light to be projected above the cutoff line CL and leading to glare. Thus, to prevent or reduce the glare, the light that travels below the rear focus F of each of the exit lenses 3210 may be blocked by the main shields 3310. The rear focus F of each of the exit lenses 3210 may vary in shape, such as a point, a line, a plane, a space, or a combination thereof, depending on the shape of an area where light is concentrated.

Additionally, when the cutoff line CL is formed as a horizontal line, as illustrated in FIG. 4, the upper portions of the main shields 3310 may be horizontal, but the present disclosure is not limited thereto. Depending on the shape of the cutoff line CL of the low beam pattern P to be formed by the vehicle lamp 1, the upper portions of some of the main shields 3310 may have different heights, forming a stepped appearance.

The additional shield part 3400 may include a plurality of additional shields (e.g., auxiliary shields) 3410, which are disposed in front of the corresponding main shields 3310. The additional shields 3410 may prevent light incident upon the incident lenses 3110 from being projected in unwanted directions by obstructing the light from entering neighboring exit lenses 3210 other than the designated corresponding exit lenses 3210.

In other words, when the light incident upon each of the incident lenses 3110 exits through the corresponding exit lens 3210, the light may be emitted approximately in parallel to the optical axis Ax. However, when the light enters other neighboring exit lenses 3210, it may be refracted upward or downward and may be irradiated in unwanted directions, thereby causing the light to be irradiated above the cutoff line CL of the low beam pattern P and leading to glare to the drivers of oncoming or preceding vehicles. Thus, the additional shields 3410 may be provided to block light from being emitted in unwanted directions.

Additionally, the additional shields 3410 may be configured to block light incident upon the lower portions of the exit lenses 3210, as light emitted above the cutoff line CL of the low beam pattern P, which causes glare, is primarily incident upon the lower portions of the exit lenses 3210.

The upper portions of the additional shields 3410 may be disposed lower than the upper portions of the corresponding main shields 3310. If the upper portions of the additional shields 3410 are disposed higher than the upper portions of the corresponding main shields 3310, it may disrupt the precise formation of the cutoff line CL of the low beam pattern P.

Furthermore, the additional shields 3410 may be formed not only in front of the corresponding exit lenses 3210, but also extend vertically to cover neighboring exit lenses 3210. This helps to prevent light from entering laterally neighboring exit lenses 3210 and being emitted in unwanted directions.

For example, the additional shields 3410 may be formed to extend from the lower portions of the corresponding exit lenses 3210 to the upper portions of adjacent exit lenses 3210 immediately below the corresponding exit lenses 3210, but the present disclosure is not limited thereto. The position, size, and shape of the additional shields 3410 may vary depending on the light distribution characteristics required of each beam pattern formed by the vehicle lamp 1, such as the position, shape, size, and brightness of the area illuminated by the vehicle lamp 1.

As previously mentioned, at least one shield part 3300 and 3400 including the main shield part 3300 and the additional shield part 3400 may be provided, but the present disclosure is not limited thereto. Alternatively, the main shield part 3300, the additional shield part 3400, or both may be optionally included or omitted depending on the light distribution characteristics of each beam pattern to be formed by the vehicle lamp 1.

Figure 8:
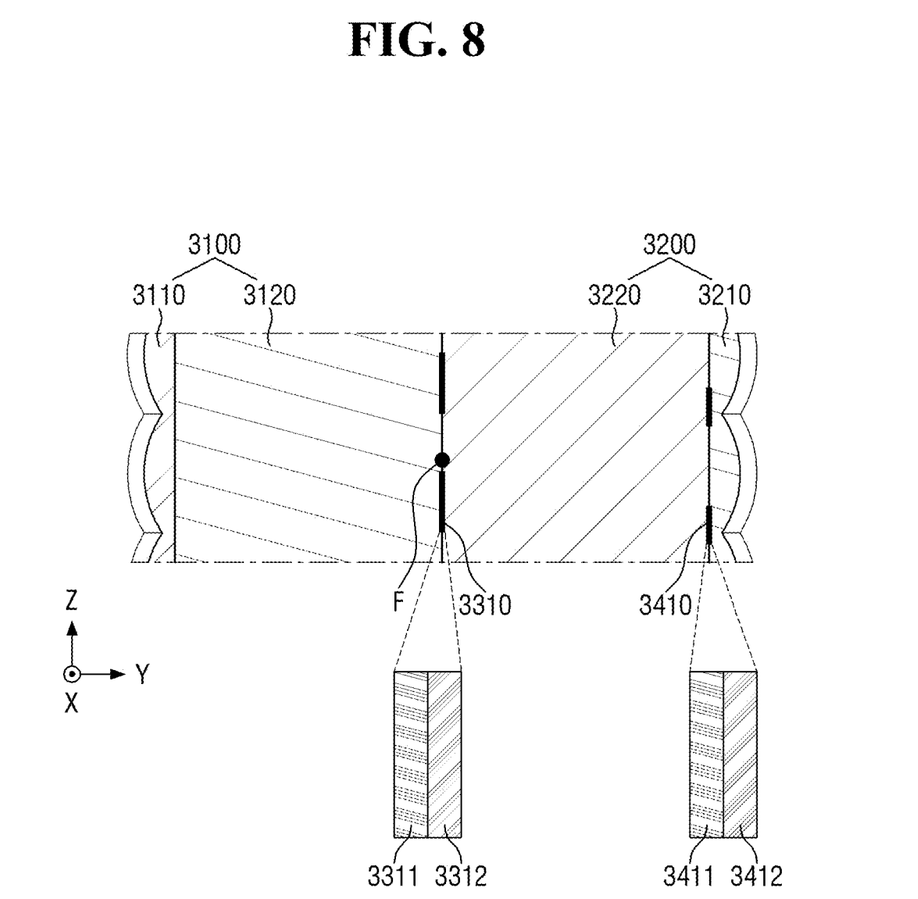
FIG. 8 is a schematic view illustrating main shields and additional shields according to an embodiment of the present disclosure.
Figure 9:
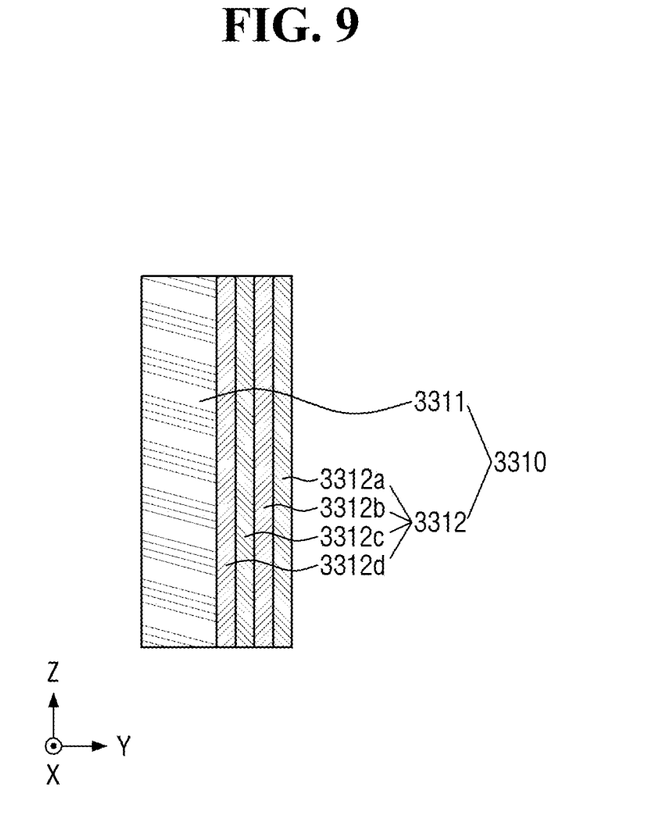
FIG. 9 is a schematic view illustrating first and second reflective parts of a main shield according to an embodiment of the present disclosure.

FIG. 8 is a schematic view illustrating the main shields and the additional shields according to an embodiment of the present disclosure, and FIG. 9 is a schematic view illustrating first and second reflective parts of the main shield according to an embodiment of the present disclosure.

Referring to FIGS. 8 and 9, the main shields 3310 may include a first reflective part 3311 and a second reflective part 3312, which is disposed in front of the first reflective part 3311.

The first reflective part 3311 and the second reflective part 3312 may be deposited or coated on the incident surface 3221 of the second light-transmitting portion 3220 to form the main shields 3310, but the present disclosure is not limited thereto. The main shields 3310 may be formed on either the exit surface 3122 of the first light-transmitting portion 3120 or the incident surface 3221 of the second light-transmitting portion 3220.

The first reflective part 3311 and the second reflective part 3312 may be formed to have different reflectivities, enabling the creation of images of different colors when viewed from the optical unit 3000 in the front-rear direction from the incident part 3100 to the exit part 3200 and vice versa. This is intended to implement an exterior design with an improved aesthetics.

Figure 10:
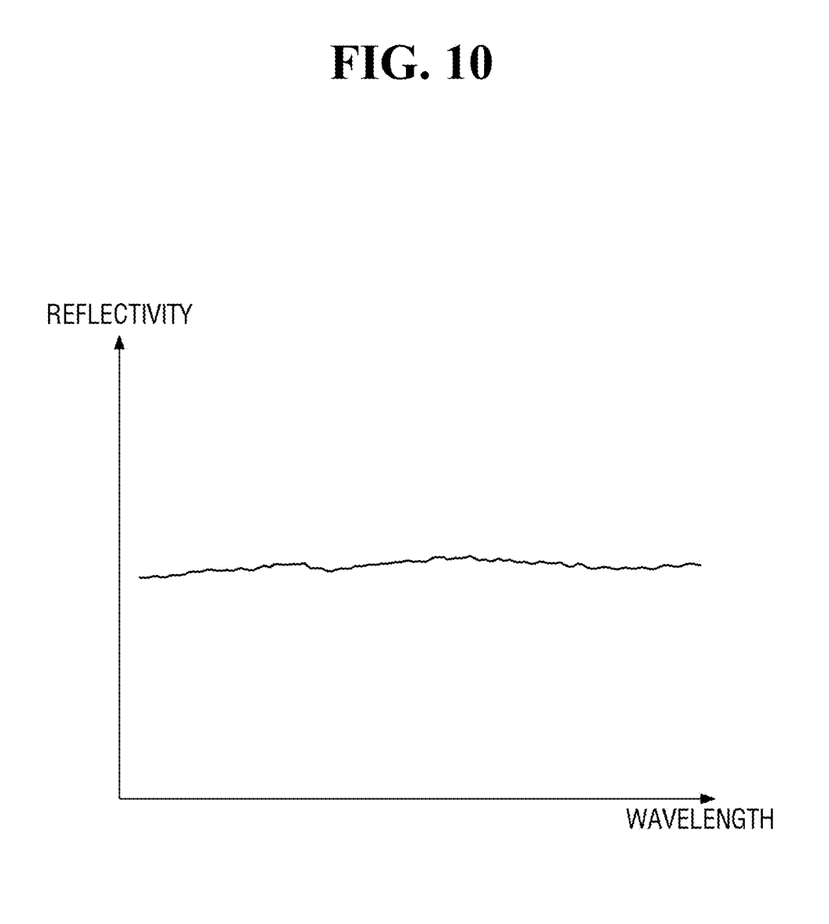
FIG. 10 is a graph showing the reflectivity of the first reflective part according to an embodiment of the present disclosure.

The first reflective part 3311 may block light originating from the light source unit 1000 that enters the optical unit 3000, to form the cutoff line of a low beam pattern. To this end, the first reflective part 3311 may be formed to have a substantially uniform reflectivity across a broad wavelength band of light, as depicted in FIG. 10.

Figure 11:
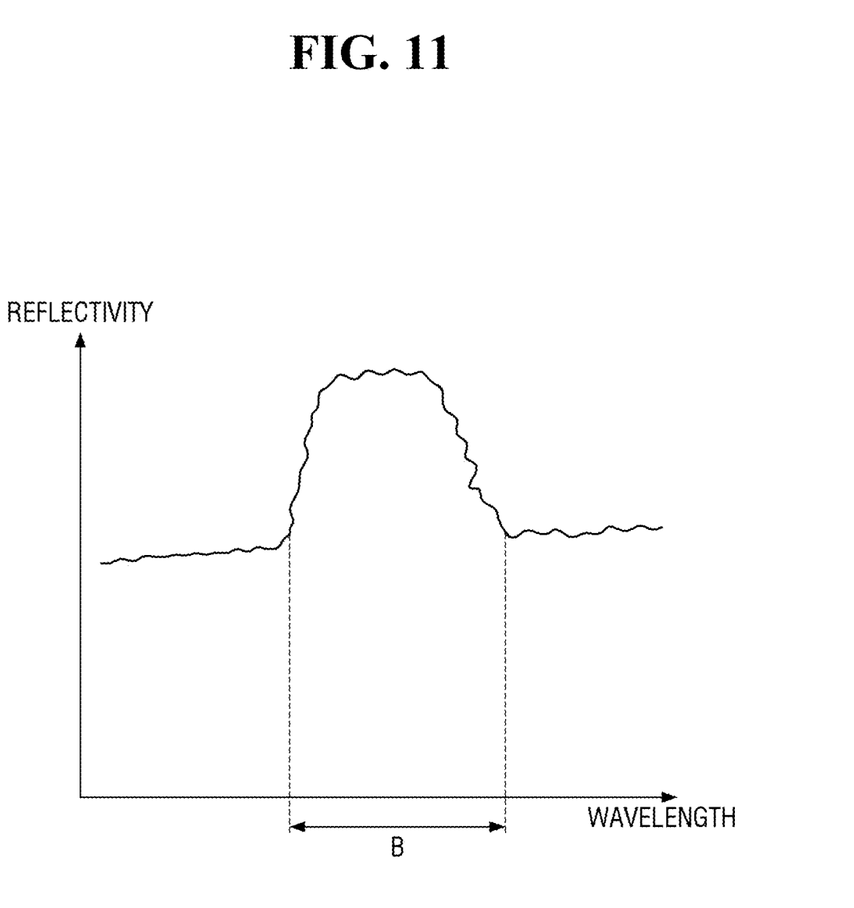
FIG. 11 is a graph showing the reflectivity of the second reflective part according to an embodiment of the present disclosure.

The second reflective part 3312 may be disposed in front of the first reflective part 3311, and may be formed to have a relatively high reflectivity for light in a predetermined wavelength band B, as depicted in FIG. 11. When external light, such as sunlight, is incident upon the optical unit 3000, light within the wavelength band B may be reflected, and light in other wavelength bands may be absorbed. This facilitates the visibility of an image corresponding to the reflected wavelength band B when the vehicle lamp 1 is observed from outside.

For example, during daytime driving, external light such as sunlight may be incident upon the optical unit 3000, and some of the external light in a wavelength band set by the second reflective part 3312 may be reflected. This enables an image of a particular color (such as red, yellow, blue, etc.) that corresponds to the wavelength band of the reflected light to be observed from outside the vehicle. Therefore, even during the day when the vehicle lamp 1 is off, an aesthetically appealing exterior design can be implemented.

In other words, during the nighttime, an image formed by light of a suitable beam pattern for the vehicle lamp 1 can be observed, and during the daytime, at least some of the external light that is incident upon the vehicle lamp 1 from outside may be reflected by the second reflective part 3312, enabling an image with a particular color to be observed.

This configuration may infer that the second reflective part 3312 may be formed to have a higher reflectivity for some wavelength bands than other wavelengths within the visible light spectrum, making it possible to form the image of the particular color by the light reflected by the second reflective part 3312.

In embodiments of the present disclosure, the second reflective part 3312 may be formed to have a higher reflectivity for some wavelength bands within the visible light spectrum in consideration that if the second reflective part 3312, like the first reflective part 3311, have a uniform reflectivity across the entire visible light spectrum, the image formed by the reflected light from the second reflective part 3312 may appear dark or black, which may adversely affect its aesthetics.

The second reflective part 3312 may be formed with a single deposition layer or multiple deposition layers 3312a, 3312b, 3312c, and 3312d. When formed with the multiple deposition layers 3312a, 3312b, 3312c, and 3312d, the second reflective part 3312 may include metal layers 3312a and 3312c whose reflectivity is adjusted by their thicknesses, and adjusting layers 3312b and 3312d that control the reflectivity for the wavelength band set by the metal layers 3312a and 3312c.

In embodiments of the present disclosure, the metal layers 3312a and 3312c may be formed of a material such as aluminum or chromium, which allows reflectivity to be determined by the thickness thereof. The adjusting layers 3312b and 3312d may be formed of a ceramic material such as $SiO_2$ or $TiO_2$, which adjusts the reflectivity for the wavelength band set by the metal layers 3312a, 3312c, depending on their thicknesses.

Additionally, in embodiments of the present disclosure, the multiple deposition layers 3312a, 3312b, 3312c, and 3312d may include two metal layers 3312a and 3312c and two adjusting layers 3312b and 3312d, which are deposited in a direction from the exit part 3200 toward the incident part 3100, alternating with the metal layers 3312a and 3312c.

However, the number, deposition order, and materials of the deposition layers 3312a, 3312b, 3312c, and 3312d are not particularly limited. Depending on the wavelength band to be reflected by the second reflective part 3312, the number, order of deposition, and materials of the deposition layers 3312a, 3312b, 3312c, and 3312d may vary.

The first reflective part 3311 may be formed with a single deposition layer, and the second reflective part 3312 may be formed with the multiple deposition layers 3312a, 3312b, 3312c, and 3312d. However, the present disclosure is not limited to this. Alternatively, the first reflective part 3311, like the second reflective part 3312, may also be formed with two or more deposition layers.

Meanwhile, each of the additional shields 3410, like each of the main shields 3310, may include a first reflective part 3411 and a second reflective part 3412. The second reflective part 3412 may be deposited or coated on the exit surface 3222 of the second light-transmitting portion 3220 to reflect light from an external source, such as sunlight, in a designated wavelength band.

In embodiments of the present disclosure, the first reflective part 3411 of the additional shields 3410 may have the same reflectivity as the first reflective part 3311 of the main shields 3310, and the second reflective part 3412 of the additional shields 3410 may have the same reflectivity as the second reflective part 3312 of the main shields 3310. However, the present disclosure is not limited to this. Alternatively, the first reflective part 3411 of the additional shields 3410 may have a different reflectivity from the first reflective part 3311 of the main shields 3310, and the second reflective part 3412 of the additional shields 3410 may also differ from the second reflective part 3312 of the main shields 3310. Here, having different reflectivities may be understood as having differences in at least one of thickness, number, order, or materials used.

Meanwhile, in embodiments of the present disclosure, if the first reflective part 3411 of the additional shields 3410 have the same reflectivity as the first reflective part 3311 of the main shields 3310, and the second reflective part 3412 of the additional shields 3410 have the same reflectivity as the second reflective part 3312 of the main shields 3310, the second reflective part 3312 of the main shields 3310 and the second reflective part 3412 of the additional shields 3410 may be configured to have a lower reflectivity than the first reflective part 3311 of the main shields 3310 and the first reflective part 3411 of the additional shields 3410 to prevent light that is reflected backward by the first reflective part 3411 of the additional shields 3410 from being undesirably re-reflected forward by the second reflective part 3312 of the main shields 3310 and from proceeding in unwanted directions.

Additionally, the wavelength band of light reflected by the second reflective part 3412 of the additional shields 3410 and the wavelength band of light reflected by the second reflective part 3312 of the main shields 3310 may be the same, but the present disclosure is not limited thereto. Alternatively, the wavelength band of light reflected by the second reflective part 3312 of the main shields 3310 may differ from the wavelength band of light reflected by the second reflective part 3412 of the additional shields 3410. In this case, an image formed by the light reflected by the additional shields 3410 may exhibit a different color from an image formed by the light reflected by the main shields 3310.

Figure 12:
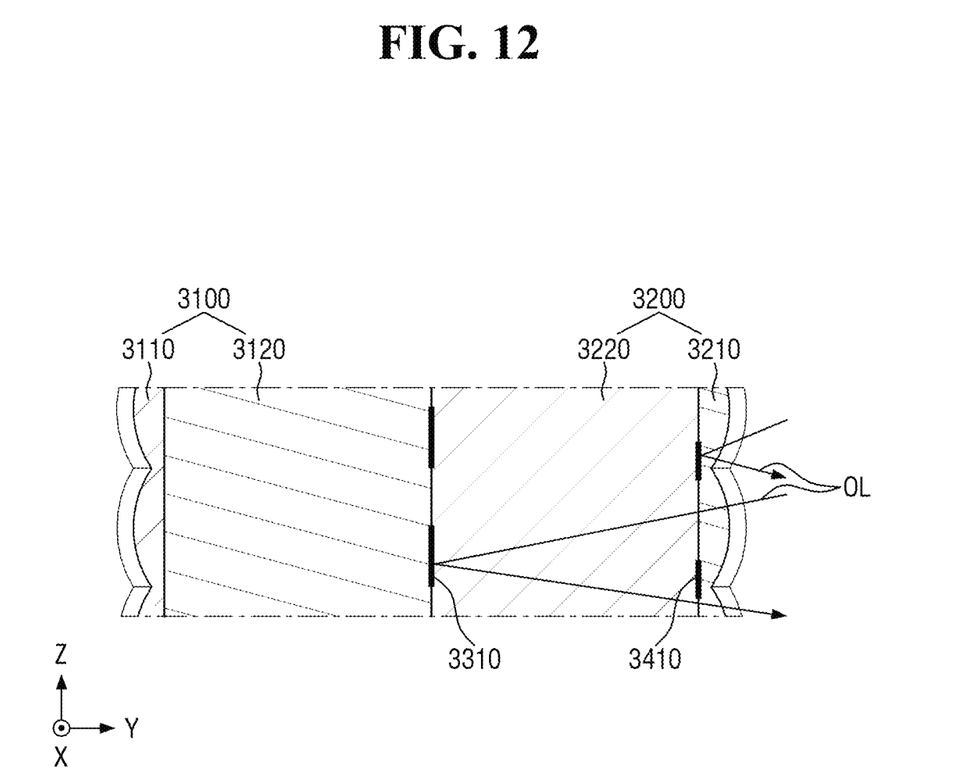
FIG. 12 is a schematic view illustrating the paths of light reflected by the second reflective parts of the main shields and light reflected by the second reflective parts of the additional shields according to an embodiment of the present disclosure.

FIG. 12 is a schematic view illustrating the paths of light reflected by the main shields and additional shields according to an embodiment of the present disclosure. Referring to FIG. 12, when external light OL, such as sunlight, is incident through the exit part 3200 of the optical unit 3000, at least some of the external light OL may be reflected forward by both the second reflective part 3312 of the main shields 3310 and the second reflective part 3412 of the additional shields 3410.

As a result, when the vehicle lamp 1 is viewed from the outside, the color of the image corresponding to the wavelength band of light reflected forward by both the second reflective part 3312 of the main shields 3310 and the second reflective part 3412 of the additional shields 3410 can be identified. Thus, even when the vehicle lamp 1 is turned off during the daytime, an image of a predetermined color can be observed, thereby enhancing the aesthetics of the exterior design.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A vehicle lamp comprising:
    a light source unit that includes at least one light source and generates light; and
    an optical unit that is disposed in front of the light source unit and allows a predetermined beam pattern to be formed by transmitting at least some of the light generated from the light source unit,
    wherein the optical unit includes:
        an incident part, which includes a plurality of incident lenses;
        an exit part, which includes a plurality of exit lenses corresponding to the plurality of incident lenses; and
        at least one shield part, which is disposed between the plurality of incident lenses and the plurality of exit lenses to obstruct some of the light traveling toward the exit lenses,
    wherein the at least one shield part includes a plurality of shields, and each of the plurality of shields includes a first reflective part and a second reflective part, which is disposed in front of the first reflective part,
    wherein the second reflective part has a non-uniform reflectivity that is selectively higher for a predetermined wavelength band within a visible light spectrum, and
    wherein the second reflective part reflects external light incident on the optical unit in the predetermined wavelength band and thereby forms an image that is visible in a color corresponding to the predetermined wavelength band.

2. The vehicle lamp of claim 1, wherein the first reflective part reflects at least some of the light generated from the light source unit back toward the light source unit.

3. The vehicle lamp of claim 1, wherein the second reflective part reflects at least some of light incident from a front side of the optical unit back toward the front side of the optical unit.

4. The vehicle lamp of claim 1, wherein the first reflective part and the second reflective part have different reflectivities.

5. The vehicle lamp of claim 1, wherein the second reflective part has a lower reflectivity than the first reflective part.

6. The vehicle lamp of claim 1, wherein the first reflective part has a substantially uniform reflectivity across different wavelength bands of light.

7. The vehicle lamp of claim 1, wherein the second reflective part has non-uniform reflectivities across different wavelength bands of light.

8. The vehicle lamp of claim 1, wherein at least one of the first reflective part or the second reflective part includes a plurality of deposition layers, which transmit therethrough or reflect light of a predetermined wavelength band.

9. The vehicle lamp of claim 8, wherein the plurality of deposition layers include metal layers whose reflectivity is determined based on thicknesses thereof.

10. The vehicle lamp of claim 9, wherein the plurality of deposition layers include adjusting layers that control the reflectivity of the metal layers for different wavelength bands of light.

11. The vehicle lamp of claim 1, wherein the at least one shield part includes a main shield part, which includes a plurality of main shields disposed at or near a rear focus of each of the exit lenses.

12. The vehicle lamp of claim 11, wherein the at least one shield part further includes an additional shield part, which includes a plurality of additional shields disposed in front of the plurality of main shields.

* * * * *